3,288,696
PRODUCTION OF CARBON BLACK
Harry K. Orbach, Orange, Calif., assignor to Ashland Oil & Refining Company, Houston, Tex., a corporation of Kentucky
Filed Mar. 12, 1963, Ser. No. 264,726
4 Claims. (Cl. 204—173)

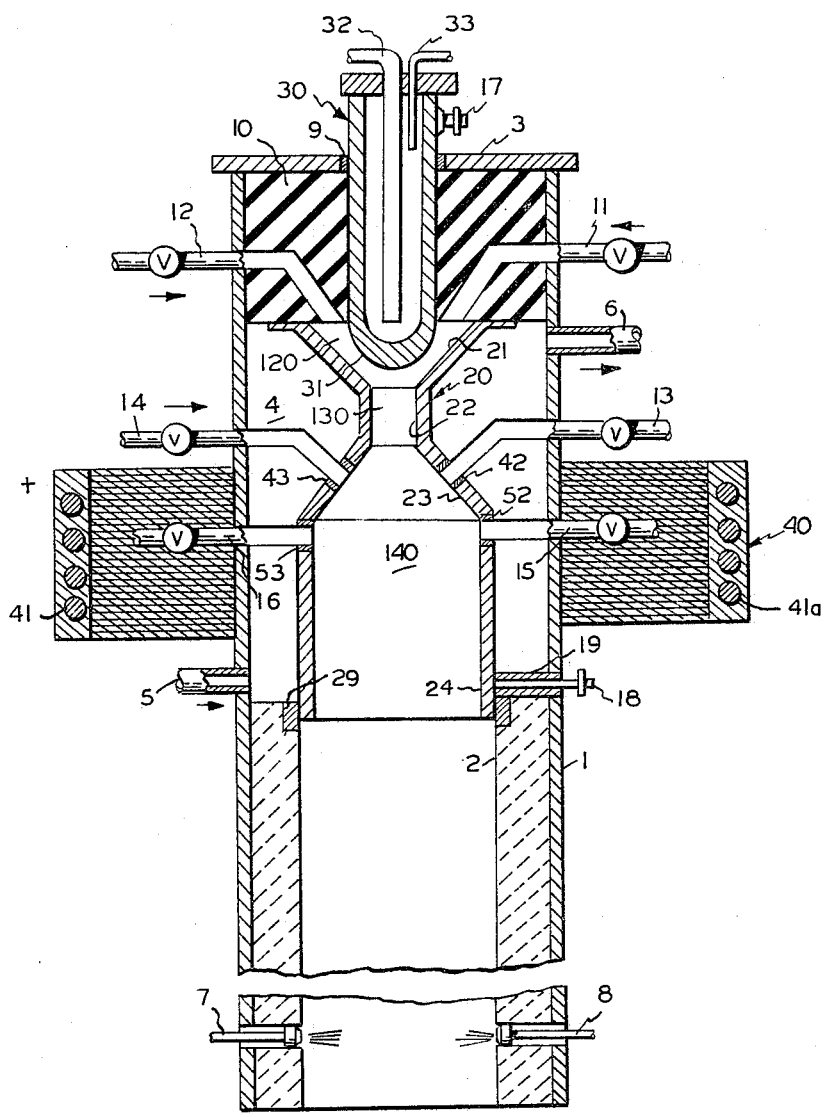

This invention relates to the art of producing carbon black. In particular, it relates to method and apparatus for the production of carbon black by subjection of hydrocarbon feedstocks to dissociation within a gas stabilized electric arc.

Carbon blacks are marketable as to grade primarily as regards the properties which they impart to rubber, particularly after vulcanization. A fundamental property affecting the grade of the carbon black is that of structure. A low structure carbon black is one which when mixed with a natural rubber or synthetic rubber-like polymer and vulcanized provides a soft, more resilient rubber. Such rubber is said to have a low modulus of elasticity; and is unlike rubber containing high structure carbon blacks. Vulcanized rubber containing high structure carbon black is characterized by having a high modulus of elasticity. Modulus is defined as that force per unit of cross-sectional area required to stretch a rubber specimen to standard elongation. It is thus a measure of the toughness or hardness of rubber and the higher the modulus the tougher or harder the rubber; or conversely the lower the modulus the softer the rubber.

More ultimately, by structure is meant the degree to which the carbon black particles of the carbon black product are associated or clustered to form chain or rod-like units. Such units, of varying lengths and geometric configurations, occur by virtue of the direct physical union of numerous particles or by virtue of the attractive forces between individual particles, or both. In a low structure carbon black there is a minimum of physical union or "twinning" of particles and a substantial proportion of the particles are discreetly divorced from all the others; or the attractive forces between the carbon black particles decrease in magnitude below the point of interference. Where there is an increase in the degree of structure, there is an increase in the number of rod-like carbon black units as well as an increase in the length of such units; or the attractive forces between the particles increase.

Structure manifests itself in a number of ways among which is the relation between structure and oil adsorption. Thus, as the degree of carbon black structure increases the capacity of the carbon black to adsorb oil also increases; and conversely as carbon black structure decreases the carbon black has less capacity to adsorb oil. Another relationship existing between carbon black and its ability to adsorb oil, however, is the degree of fineness of the carbon black. The degree of fineness relates directly to particle size. The smaller the size of the individual particles of carbon black the greater the surface area and the greater the ability of a given weight of carbon black to adsorb oil; and conversely the larger the particle size the lesser the surface area and the lesser the ability of a given quantity of carbon black to adsorb oil. But from these phenomena it is apparent that where two grades of carbon black have corresponding surface areas then as carbon black structure increases, the capability to adsorb oil correspondingly increases. From this phenomenon, there has been derived the oil adsorption test for measuring the degree of structure.

Carbon blacks on the basis of surface area and oil adsorption are classified in regard to levels of low, normal and high structures (Rubber Age, vol. 89, No. 2, pages 269–282). Most blacks fall within the low and normal structure classification. Considered as normal structure blacks are, for example, super abrasion furnace blacks (SAF), a typical sample of which has a surface area of about 132 square meters per gram of carbon black and an oil adsorption factor of from about 125 to 135 milliliters of oil per one-hundred grams of carbon black. Intermediate super abrasion blacks (ISAF) and high abrasion furnace blacks (HAF), among other normal structure blacks, show lower degrees of structure having surface areas ranging from 110–130 and 70–90 square meters per gram, respectively, and oil adsorption factors ranging from about 115–135 and from about 105–125 milliliters per 100 grams. Fast extrusion furnace black (FEF) is of even lower structure having a surface area ranging from 40–55 square meters per gram and an oil adsorption factor ranging from 134–144 milliliters per 100 grams. Few commercial carbon blacks show a higher degree of structure though thermal blacks show a significantly lower level of structure.

For several important reasons most carbon black is produced commercially by furnace techniques. Furnace type carbon blacks are thus produced by thermal decomposition of a normally liquid hydrocarbon feedstock in the absence of a sufficient amount of air to oxidize the carbon produced in the reaction. Pursuant to such method, the hydrocarbon feedstock is injected directly into a reaction chamber containing a high temperature flame provided by the combustion of a combustible mixture of oxygen and fuel, usually air and natural gas. Many of these methods do not provide the high structure carbon blacks now needed in increasing quantities.

One type of method of academic and minor interest relates to the production of carbon by contacting a hydrocarbon feed with an electric arc. While such processes have generally long been known to the art, they do not appear to have assumed any real importance. This is apparently due to a number of factors.

A major problem encountered in connection with the use of such electric arc processes is that of electrode erosion. This problem in itself appears to have played a major role in deterring the use of such processes. Thus, even where high quality metals are used as electrode materials it is not long before severe erosion of the electrode surfaces occurs. Anode erosion is particularly acute. Not only does anode erosion cause inordinately expensive maintenance problems, but in addition it gives rise to the production of contaminating impurities which interfere with the quality of the final carbon black.

On the other hand, where it has been sought to alleviate the problem of impurities by the continuous provision of a consumable high purity carbon anode this obviously leaves something to be desired. Thus, impurities can be eliminated from the product and essentially pure carbon black obtained by continuously feeding high purity carbon as an anode into the proximity of the cathode. This, however, requires constant attention to maintain the proper geometric relationship between anode and cathode. Moreover, inter alia, the necessity of furnishing high purity carbon to be consumed in this manner is burdensome.

In view of these and other deficiencies, then, there is need in the art for a process and apparatus capable of producing high structure carbon black. Moreover, there is need for a new and improved electric arc process and apparatus for producing carbon black, particularly of such flexibility to produce a range of grades of high structure blacks.

It is accordingly the object of the present invention to meet these needs. Thus, it is an object to obviate these and other prior art deficiencies and to provide the art with a process, particularly an electric arc process, capable of producing high structure carbon black. Another object is to provide a process and apparatus for producing carbon black of high structure as good as and in some instances superior to that made by existing processes and apparatus. The further object is to provide a particularly novel apparatus obviating the problem of arc erosion which apparatus can operate economically and efficiently.

These and other objects are achieved in accordance with the method of this invention which comprises decomposing an aromatic hydrocarbon feedstock to carbon black by injecting it directly into a whirling, spinning body of gases within which an electric arc is discharged. More specifically the method comprises striking a negative resistance arc between cathode and anode and feeding through the arc a substantially inert gas in such a manner as to form a vortex. Into this vortex-stabilized electric arc is then injected an aromatic hydrocarbon feedstock which is instantaneously decomposed to carbon black. The carbon black bearing gas stream can then be quenched, if desired, by the injection therein of a substantially inert fluid and the carbon black then recovered by conventional means which form no part of this invention.

For a more complete understanding of the process of this invention reference is made to the accompanying drawing wherein is shown a schematic cross sectional elevation view of a reactor wherein this invention can be practiced. At the heart of the reactor lies the cathode assembly 30 and the venturi section 20, which sub assemblies are substantially co-axially aligned upon the tubular steel shell 1, constituting the major outer confines of the reactor. In particular, the cathode assembly 30 is passed through the center of plate 3 which caps one end of the reactor, and is projected into the upper frusto-conic opening of the venturi section 20. The upper diverging walls 21 of the frusto-conic opening forms, with the cathode surface 31 an annular cathode zone 120. The cathode assembly 30 is electrically insulated from the plate 3 by the annular ring gland 9. The cathode assembly is also electrically insulated from the reactor wall 1 and from the venturi section 20 by the annular ring blocks 10.

The annular cathode zone 120 opens through the constricted passage 130, formed by the cylindrical walls 22, into the lower portion of the venturi section 20. The lower portion of the venturi section 20, forming an anode zone 140, is constituted by the lower frusto-conic opening formed by the divergent walls 23 and cylindrical walls 24.

Opening tangentially into the cathode zone 120 are lines 11, 12 through which an inert stabilizer gas can be fed to the cathode zone 120. These lines are effectively electrically insulated from the cathode and anode by the electrically insulating annular ring blocks 10. Opening into the frusto-conic portion of the anode zone 140 are lines 13, 14 through which an aromatic hydrocarbon feedstock can be fed at the time the arc is struck. Opening tangentially into the anode zone are lines 15, 16 through which steam, water or other fluid can be fed upon the walls 23, 24 to lessen coke formation. The lines 13, 14, 15, 16 are electrically insulated from the anode surfaces via insulation 42, 43, 52, 53 located between the lines 13, 14, 15, 16 and walls 23, 24. Surrounding the venturi section 20 is a waterjacket 4 for cooling the outer walls of the venturi section 20. Cooling water can be fed into the waterjacket 4 via line 5 and the warmed water after circulation through the waterjacket can be removed via line 6.

The lower end of the reactor walls 1 is lined with a refractory material 2. This refractory material 2 protects walls of the reactor from hot gases which emanate from the reactor. The exit gases can also be quenched, as with water or steam, if desired, by the spray devices 7, 8 located within the walls of the reactor.

The cathode assembly 30 is cooled by passage of cooling water into the cylindrical cathode via line 32, which water rises along the inner surfaces of cathode walls 31 and exits via line 33.

Electrical leads (not shown) are connected from a source of potential, such as a generator of convenient size (not shown), to the cathode assembly by contact 17 and to the anode by contact 18. The contact 18 is electrically insulated from the wall 1 and from the refractory 2 by insulating block 19. The refractory 2 is also electrically insulated from the venturi section 20 by insulating block 29.

A schematic representation of an electro-magnetic field producing means adjacent and surrounding the anode zone 140 is also shown. A cross-section of coil 40 shows a series of wires, such as wires 41, 41A which are positive and negative, respectively. A magnetic field can be used to swirl the electric arc at any desired rate. The coil 40 carries a direct current which produces a driving force on the arc, in accordance with the well known "right hand rule" causing it to rotate. Different rotational velocities are produced by the provision of different coil 40 currents, a stronger current producing a stronger field and consequently more rapid rotation. So, into this arc can be fed the stabilizer gas even linearly if desired because the magnetic field will swirl the ionized gases to form a vortex.

In operation, a stabilizer gas, as for example nitrogen, is continuously introduced through lines 11, 12 and a potential is created between cathode 30 and the walls of the venturi section 20. Upon application of sufficient potential an arc will be struck between the cathode 30 and the walls 23, 24. The arc does not attach to any significant degree to the walls forming the cathode zone 120 or to the walls 22 forming the constriction 130 when the stabilizer gas is introduced at sufficient velocity. Instead, because of the ohmic forces created between the stabilizer gas and the electric arc, the arc is dynamically struck at points upon the walls 23, 24. The feed hydrocarbon is introduced into the gas stabilized arc vortex whereupon it is dissociated into essentially hydrogen and carbon. Carbon deposition upon the walls 23, 24 by the hot gases emanating from the arc are controlled to some extent by injection of air, water or other non-flammable fluid upon the walls. From these gases emanating from the reaction, carbon is collected in conventional manner as by passage through agglomerating and collection means consisting of cyclone separators, electric precipitators, bag filter, or by a combination of all of these devices.

Within the vortex the negative resistance arc is moved aerodynamically in a whirling circular motion. The vortex of gas acts as a resistance element which is heated by ohmic forces and is used to convey heat to the feedstock. The vortex rapidly disperses the hydrocarbon feedstock toward its center or cavity thereby assuring good contact with the electric arc. This results in fairly rapid dissociation of the hydrocarbon feedstock. Moreover, the vortex effectively dynamically moves to point of attachment, or attachments, of the electric arc so that the normal corrosiveness thereof at a point, or points, of attachment is dissipated. Furthermore, the arc is moved to the anode and away from other cell components. In addition, the high velocity flow of the vortex gas past the cathode prevents the diffusion of the feed hydrocarbon to the cathode, thus reducing erosion.

The vortex can be created by tangentially blowing a substantially inert gas through the arc at high velocity via lines 11, 12 as shown in the figure. This action of a stabilizer gas as it enters the cathode zone 120 and passes through zone 130 to the anode zone 140 effectively and continually moves the point, or points, of attachment of the arc radially. An electro-magnetic field, produced as by the coil 40 in the drawing can also be used to induce the swirling motion of the arc while the stabilizer gas and hydrocarbon feed are introduced into the arc. In this manner the arc, and vortex, can be spun at essentially any desired speed while the aromatic hydrocarbon feed is fed as via lines 13, 14 into the vortex. The stabilizer gas, dissociation gases and reaction products spiral about an axis along a path away from the stabilized electric arc vortex, and out of the reactor.

For good yields it has generally been found preferable to operate at a reaction temperature ranging from about 1300° K. to about 3600° K. Best yields are obtained when operating within a range of from about 1300° K. to about 2200° K. While temperatures higher than about 3600° K. can be used, this is not generally desirable in that the economy of the process diminishes without substantially corresponding production advantages. By reaction temperature is meant the temperature in degrees Kelvin of the gases leaving the reaction; inert, reactant and by-product gases. The term reaction temperature thus has no reference to the arc flame temperature but rather has reference only to the mass temperature of the off-gases.

To provide these outstanding results feedstocks containing high concentrations of aromatic hydrocarbons, are fed with a stabilizer gas into the electric arc vortex. Preferably a feedstock should contain at least about 40% by weight aromatics to provide good quality high structure carbon blacks, and at high economy. Aromatic hydrocarbons suitable in the practice of this invention are, for example, those containing from 6 to about 24 carbon atoms, and higher. Exemplary of such compounds are toluene, xylenes, naphthalenes and the like. Feedstocks containing such aromatic hydrocarbons are likewise suitable.

Normally available and highly suitable feedstocks include those resultant from numerous refinery processes, both the petroleum and coke oven variety. Such aromatic feedstocks are those containing at least 40–60% aromatics, and generally higher of total aromatics. These feedstocks are conveniently characterized as containing an atomic hydrogen:carbon ratio ranging from about 0.70 to about 1.3. Those feedstocks having an atomic hydrogen:carbon ratio ranging from about 0.75 to about 1.25 and having from about 80 to about 90% total aromatics content are found particularly useful in accordance with this invention.

Feedstock is preferably preheated and fed or injected into reaction as a vapor, along or with a carrier gas, or can be sprayed into the arc in a state of fine subdivision or atomization. Preheating of the carrier gas is also desirable, and as the preheating of the feedstock, lessens power consumption.

The stabilizing gas used for creation of the vortex as by tangential feeding to the arc can be any which is essentially non-reactive or inert to the reaction. Thus, any of the noble gases—e.g. argon, krypton, and the like—can be employed but preferably some of the more common gases such as hydrogen, nitrogen, and the like are used. The stabilizing gas is also preferably preheated to lessen total power consumption.

The aromatic hydrocarbon feedstock is generally used in molar proportions of from about 0.2:1 to about 1:1 of aromatic hydrocarbon:stabilizer gas. More preferably, however, the molar ratio of aromatic hydrocarbon feed: stabilizer gas ranges from about 0.35:1 to about 0.75:1. By injection of aromatic hydrocarbon feedstocks into the vortex pursuant to these conditions the hydrocarbon feedstock decomposes into a stream consisting essentially of hydrogen and high structure carbon black. The reaction is conducted with less coking at the anode surface if a fluid, preferably water or steam, is injected upon the walls of the anode in contact with the stream emanating from the vortex. Such injection means are shown in the figure by reference to lines 15, 16 entering tangentially to the anode zone 140. These injected fluids can react with the carbon deposits upon the walls or if an inert fluid is used, the walls are kept clean by mechanical dislodging of the carbon deposits. Water and air thus partially react with the carbon deposits and are therefore particularly useful. Air is also useful in that it provides additional cracking energy by partial combustion of part of the feedstock with the oxygen of the air. The cooled carbon black containing gas stream may then be further treated to recover the carbon black.

The vortex is operated with an arc possessing a negative resistance characteristic. Thus, it differs from the high erosion arc wherein additional voltage is required between anode and cathode to increase the current. This is in conformity with Ohm's law. In the negative resistance arc of this invention, however, an increase in voltage produces a decrease in current. This is referred to as a negative resistance characteristic and is not in accordance with Ohm's law. Operation in accordance with this negative resistance characteristic produces an arc having a considerably high flame temperature. Moreover, even the stabilized arc is characterized by luminous gases wherein temperatures range as high as several thousand degrees Kelvin; and in this range of temperature the arc is normally extremely erosive even to high quality metals.

The arc can be produced by either a direct current or potential or can be produced by an alternating current or potential. The direct current can be constant or of the pulsating type and the alternating current can be produced by either single phase or multiphase electrical generating means. The latter is most desirable for many industrial applications.

Pursuant to this invention the normal erosiveness of the arc is reduced by creation of a gas stabilized vortex which tends not only to reduce the metallic corrosion but also provides for the dissociation of the aromatic hydrocarbon reactant so that high structure carbon black is obtained; and in good yield.

The stabilizer for best results, should flow past the cathode surfaces at sufficient velocity to prevent the arc from attaching to any surfaces other than that of the anode and to prevent diffusion of the feed hydrocarbon to the cathode. It is found that the stabilizer gas should generally flow at a minimum velocity of from about 1600 cubic feet per hour per square inch to a maximum of about 20,000 cubic feet per hour per square inch in cross sectional area adjacent to the cathode surface.

The electrodes are composed of any conducting materials, though preferably they are composed of metals which are capable of being rapidly cooled sufficiently to withstand the high temperatures. The anode in particular should be composed of a metal which can be rapidly cooled to withstand high temperatures and which does not produce undesirable impurities. A cathode material of tungsten, or a tungsten tipped cathode, and an anode material of copper or copper alloy have been found to give good results.

The invention will be further demonstrated by reference to the working examples given below. From these illustrative data it will be seen that the present process is capable of producing a wide range of grades of high structure carbon blacks. This will be shown specifically by comparison of the carbon blacks of this invention with existing commercial carbon blacks of normal structure. The surface areas, in square meters per gram, of the carbon black of this invention and those of commerce are determined by measuring their surface areas against nitrogen (BET Surface Area; Brunauer, Emmet and Teller, JACS vol. 60, page 309, 1938). Having thus determined the surface areas of the carbon blacks comparisons are made between the carbon blacks of this invention with several grades of commercial grade furnace blacks on the basis of corresponding surface areas. Such comparisons are made on the basis of oil adsorption. On this basis the oil adsorption factors give a good comparison of the structure of the carbon blacks.

Now, as will be seen, the carbon blacks of this invention when compared with commercial carbon blacks of corresponding surface areas more readily adsorb oil, this indicating higher structure. In fact, as will be shown, carbon blacks produced in accordance with this invention have oil factors ranging as high as from about 170 to about 250 which is sharply contrasted with carbon blacks produced by present commercial processes, with a generally corresponding range of surface areas, these latter having oil factors ranging generally only from about 100 to about 150.

To determine oil adsorption factors, given herein as milliliters (ml.) of oil adsorbed per 100 grams (gms.) of carbon black, linseed oil is incrementally added to weighed quantities of carbon black while working the mixture with a spatula. Oil addition is continued until the mixture reaches a predetermined consistency which constitutes the end point (ASTM D 281–28T). The mixing procedure and determination of the end point is susceptible to reasonable reproducibility and is accepted by the industry as a means for measuring the relative structure characteristics of different carbon blacks.

*Example I*

Applying a 200 volt potential (open circuit), a negative resistance arc is struck between anode and cathode in apparatus similar to that described. Through the arc is tangentially fed upstream of the cathode 244 parts per hour of nitrogen gas to effectively stabilize the arc as a vortex. In the downstream portion of the vortex, and within the anode chamber is fed a mixture of 193 parts per hour of vaporized benzene in 287 parts of a nitrogen carrier gas. Upon contact with the vortex the vaporized benzene reacts at a reaction temperature of 1800° K. (Kelvin) and is decomposed into carbon black. Slightly downstream of the point of injection of the feed hydrocarbon a spray of water is projected upon the anode walls. This spray of water aids in preventing the formation of carbonaceous deposits upon the anode walls.

Downstream of the point of water injection the gaseous stream is quenched and then subjected to a conventional recovery system to collect the carbon black. There is evidence that 80–90% of the available carbon of the benzene is converted to carbon black having a surface area of 144 square meters per gram measured with nitrogen. The oil factor of this carbon black is 230.

In contrast, a commercial super abrasion furnace (SAF) black having also a surface area of 144 square meters per gram against nitrogen is found to have an oil factor of 135.

*Example II*

When the foregoing example is repeated except that 252 parts of nitrogen is fed to the arc as a stabilizer gas and a mixture of 243 parts of nitrogen and 368 parts of vaporized benzene is fed into the arc and the reaction conducted at a temperature of 1455° K., a very high yield of carbon black having a nitrogen surface area of 44 is obtained. The oil factor of the carbon black is found to be 247.

In contrast, a fast extrusion furnace (FEF) black having a nitrogen surface area of 44 is found to have an oil adsorption factor of 135.

*Example III*

An aromatic oil feed having the following tabulated characteristics is preheated to 670° F., atomized and sprayed into the vortex under conditions generally similar to those of Example I.

| | |
|---|---|
| API gravity at 60° F. | 3.5 |
| Specific gravity 60/60° F. | 1.0481 |
| Ash, percent | 0.003 |
| Pour point, ° F. | 50 |
| Flash point, ° F. | 158 |
| Conradson carbon, residue, percent | 8.9 |
| Sulfur, percent | 0.74 |
| Aromatics, percent | 75.0 |
| Saybolt viscosity, SSU at 210° F. | 59.1 |
| Correlation index | 107 |
| Asphaltenes, percent | 3.5 |

| Distillation: | 760 mm. ° F. |
|---|---|
| I.B.P. | 360 |
| 5% | 610 |
| 10 | 682 |
| 20 | 753 |
| 30 | 788 |
| 40 | 815 |
| 50 | [1] 840 |
| 60 | 865 |
| 70 | 906 |
| 80 | 957 |
| 85 | [2] 990 |

[1] Midpoint.
[2] Cracked.

A good yield of carbon black is obtained. It is found that the oil factor of this carbon black is significantly higher than carbon black formed from the same oil in a furnace.

The following data of Table I further demonstrates the flexibility of the process in obtaining a variety of grades of high structure carbon blacks pursuant to a range of operating conditions. In the operation of the process nitrogen is again used as a stabilizing gas and essentially pure benzene vapor is employed as a feed. The reactions are conducted at temperatures ranging from 1800° K. to 2200° K. The quantity of nitrogen and benzene fed to the reaction is given in terms of cubic feet per hour at standard conditions. Conversion of the benzene to carbon black based on total available carbon, is given in percent. Surface areas and oil factors are given for the carbon blacks produced, and following these, data comparisons are made of these carbon blacks with presently commercially available normal structure furnace blacks.

TABLE I

| Example | Stabilizer Gas | Feed | Percent Conversion | Surface Area | Oil Factor |
|---|---|---|---|---|---|
| IV | 532 | 245 | 67.4 | 69 | 232 |
| V | 533 | 282 | 64.7 | 70 | 220 |
| VI | 486 | 218 | 74.3 | 99 | 220 |
| VII | 629 | 154 | 78.8 | 112 | 211 |
| VIII | 653 | 195 | 76.9 | 115 | 186 |
| IX | 376 | 192 | 76.6 | 141 | 209 |
| X | 425 | 146 | 71 | 164 | 177 |

From these data it will be seen that the carbon blacks produced pursuant to Examples IV and V have surface areas corresponding to an HAF grade of carbon black; that of Examples VII and VIII correspond to ISAF grades of carbon black; Example VI provides a carbon black intermediate to these grades; Example IX corresponds in surface area to an SAF grade of carbon black and Example X corresponds to an even higher grade of carbon black. On the basis of oil factors, however, it is observed that the carbon black of this invention provides higher structure. Thus, as is known, an HAF grade of carbon black normally provides an oil factor ranging from about 105–125 milliliters per 100 grams of carbon black. But, in sharp contrast the carbon black of Examples IV and V provide oil factors of 232 and 220, respectively. The carbon blacks of Examples VII and VIII also provide high oil factors. Thus, the carbon blacks of these examples provide oil factors of 211 and 186 milliliters per 100 grams of carbon black, respectively, whereas the ISAF carbon blacks of commerce which have corresponding surface areas provide oil factors of only about 115–135 milliliters per 100 grams of carbon black. The carbon black of Example VI provides an even higher oil factor, i.e. 220, even though on the basis of surface area it lies intermediate HAF and ISAF grades of carbon black. The carbon black produced pursuant to Example IX corresponds to an SAF grade of carbon black; as did that produced in accordance with Example I. This oil factor of 209 is, however, sharply contrasted with the normal range of about 125–135 milliliters per 100 grams for an SAF grade of carbon black. As will be noted the carbon black of Example I produced an even higher oil factor of 230. Carbon black produced pursuant to Example X has a surface area even greater than that of a normal SAF grade of carbon black but provides an oil factor of 177 milliliters per 100 grams, which is above that normally obtained even for an SAF grade carbon black. It is quite obvious therefore that the present process is capable of providing a range of grades of carbon blacks, and of high structure.

The following further exemplifies the properties of the carbon blacks produced in accordance with the present invention. Thus, in Table II below comparative data is set forth showing the outstanding properties of butadiene-styrene rubber (SBR) blended with carbon black produced pursuant to this invention. The carbon black of Example I is randomly selected and milled with SBR. This rubber is compared with a similar rubber but one including a presently commercially available grade of carbon black of generally corresponding surface area. The latter rubber, marked as a control in the table, is prepared from SAF carbon black.

The carbon blacks are incorporated in SBR rubber along with the necessary auxiliary agents to permit vulcanization. The rubbers are compounded according to the following formulation:

| Ingredient | Parts |
|---|---|
| SBR–1500 | 100 |
| Carbon Black | 50 |
| Softener | 5 |
| Zinc Oxide | 5 |
| Sulfur | 2 |
| Stearic Acid | 1.5 |
| Mercaptobenzothiazole | 0.8 |
| Diphenylguanidine | 0.25 |

These formulations are thoroughly mixed on a Banbury, the front rotor speed of which is 115 r.p.m.; and the ratio of the speed of the front rotor to that of the back rotor is 1.127. Water is circulated through the Banbury at a temperature of 85° F. during the mixing cycle. The total mixing cycle is 9 minutes. The compositions are cured at 293° F. and then tested. The results are as shown in the following table.

TABLE II

|  | Control (SAF) | Example I (SAF) | Control (HAF) | Example IV (HAF) | Control (ISAF) | Example VII (ISAF) |
|---|---|---|---|---|---|---|
| Average Modulus at 300 %/(P.S.I.) | 1,866 | 2,250 | 1,593 | 2,409 | 1,787 | 2,665 |
| Shore Hardness: |  |  |  |  |  |  |
| 30 Min. | 59 | 65 | 56 | 65 | 56 | 64 |
| 60 Min. | 65 | 68 | 61 | 68 | 62 | 66 |
| 120 Min. | 67 | 69 | 64 | 68 | 65 | 68 |
| Percent Ext'n. Shrinkage | 58.4 | 50.5 | 41.7 | 50.3 | 37.6 | 49.7 |
| Percent Swell Ext'd. Stk. | 133 | 98 | 67.5 | 98 | 60.7 | 92 |
| Ext'n. Gms./Min. | 22.8 | 23.5 | 85.2 | 29.9 | 92.1 | 25.0 |
| Viscosity ML–4 | 69 | 79 | 60 | 70 | 67 | 74 |

From the foregoing it is seen that the carbon blacks of this invention when incorporated in SBR provide higher modulus, low shrinkage and good or satisfactory extrusion properties. Moreover, they reinforce and impart hardness to rubber.

The carbon blacks of this invention are also found to impart a high degree of electrical conductivity to rubber.

*Example XI*

When cold SBR consisting of 78 percent butadiene and 22 percent styrene are milled with a high structure carbon having an oil factor of 170, produced in an electric arc at a reaction temperature ranging from 2000° K. to 2200° K. from an aromatic hydrocarbon feedstock similar to that given in Example III, excellent high modulus rubber-like properties are similarly obtained.

The carbon blacks of this invention are not only useful for conventional rubbers but are also useful with stereo elastomers. Thus, various stereo-regulated rubber-like polymers have presently reached a stage of development where there they are being considered, and to some extent employed, as replacements for SBR and natural rubbers. Important stereo-regulated rubber-like polymers are the polybutadienes, particularly the polybutadienes containing large amounts of the cis-1,4 isomer.

*Example XII*

The carbon black of the foregoing Example X is randomly selected and blended with polybutadiene (100% CIS–4) and 20 parts per hundred by weight of oil and worked on hot rolls at 150° F. The carbon black disperses quite readily within the blending mixture, requiring only a few minutes. When the tensile strength, 300% modulus and hardness (Shore A), (cure time 60 minutes at 280° F.) of the rubber are determined these properties are found significantly higher than those imparted to the same rubber employing the more conventional carbon blacks.

Superior properties of running temperature (Firestone Flexometer) and rebound (Goodyear Healy) when cured for 80 minutes at 280° F. are also found. Moreover, the rubber employing the carbon black of this invention is found to possess good abrasion resistance.

Obvious modifications and alterations will be apparent to those of skill in this art and can be made without departing the spirit and scope of the present invention.

I claim:

1. In the production of carbon black by reaction of an aromatic hydrocarbon within an electric arc the process comprising striking an electric arc having a negative characteristic between cathode and anode, feeding through the arc a substantially non-reactive stabilizing gas, forming a vortex within the gas stabilized electric arc, injecting into the vortex an aromatic hydrocarbon which dissociates into a stream consisting essentially of hydrogen and carbon, and then recovering the carbon produced in the reaction.

2. The process of claim 1 wherein the non-reactive stabilizing gas is injected tangentially into the electric arc to form a vortex.

3. The process of claim 1 wherein the non-reactive stabilizing gas is injected into the electric arc, while simultaneously the arc is subjected to the action of a magnetic field in forming a vortex.

4. The process of claim 1 wherein the reaction is conducted at a temperature ranging from about 1300° K. to about 3600° K.

References Cited by the Examiner
UNITED STATES PATENTS 3,009,783  11/1961  Sheer et al. _____ 204—173 X
3,167,449  1/1965  Spacil _____ 204—173 X JOHN H. MACK, *Primary Examiner.*

H. M. FLOURNOY, *Assistant Examiner.*